United States Patent
Bish et al.

(10) Patent No.: US 7,381,774 B2
(45) Date of Patent: Jun. 3, 2008

(54) PERFLUOROELASTOMER COMPOSITIONS FOR LOW TEMPERATURE APPLICATIONS

(75) Inventors: Christopher John Bish, Kennett Square, PA (US); Michael Cregg Coughlin, Wilmington, DE (US)

(73) Assignee: DuPont Performance Elastomers, LLC, Wilmington, DE (US)

( * ) Notice: Subject to any disclaimer, the term of this patent is extended or adjusted under 35 U.S.C. 154(b) by 129 days.

(21) Appl. No.: 11/257,539

(22) Filed: Oct. 25, 2005

(65) Prior Publication Data
US 2007/0093608 A1 Apr. 26, 2007

(51) Int. Cl.
*C08F 214/18* (2006.01)

(52) U.S. Cl. .................. 525/326.2; 524/208; 525/186; 525/187; 525/326.3; 525/387; 526/247; 526/250

(58) Field of Classification Search ............ 525/326.2, 525/326.3, 187, 186, 387; 524/208; 526/247, 526/250
See application file for complete search history.

(56) References Cited

U.S. PATENT DOCUMENTS

| | | | |
|---|---|---|---|
| 4,214,060 A | 7/1980 | Apotheker et al. | |
| 4,243,770 A | 1/1981 | Tatemoto et al. | |
| 4,894,418 A | 1/1990 | Strepparola et al. | |
| 4,983,680 A | 1/1991 | Ojakaar | |
| 5,214,106 A | 5/1993 | Carlson et al. | |
| 5,268,405 A * | 12/1993 | Ojakaar et al. ............ 524/366 |
| 5,545,693 A * | 8/1996 | Hung et al. ............ 525/187 |
| 5,585,449 A | 12/1996 | Arcella et al. | |
| 5,696,189 A * | 12/1997 | Legare ............ 524/232 |
| 5,717,036 A | 2/1998 | Saito et al. | |
| 5,789,489 A | 8/1998 | Coughlin et al. | |
| 5,877,264 A | 3/1999 | Logothetis et al. | |
| 6,211,319 B1 | 4/2001 | Schmiegel | |
| 6,281,296 B1 | 8/2001 | MacLachlan et al. | |

FOREIGN PATENT DOCUMENTS

WO WO 01/27194 A1 * 4/2001

OTHER PUBLICATIONS

Du Pont Krytox Performance Lubricants, Product Information, Brochure No. H-58519-2, Aug. 2003.
DuPont Krytox, Performance Lubricants, Product Information, Brochure No. H-58530-1, Mar. 2003.
DuPont Krytox Performance Lubricants, Product Information, Brochure No. H-58510-1, Sep. 2002.
Solvay Solexis PFPE Fluids Product Literature, Copyright 2004.
Solvay Solexis, Fomblin PFPE Lubricants, Product Information, pp. 1-5, Modified Oct. 14, 2004.
Daikin, Product Information, Fluorochemical Lubricating Oils and Greases, Copyright 2000.

* cited by examiner

*Primary Examiner*—Peter D. Mulcahy
*Assistant Examiner*—Henry Hu

(57) ABSTRACT

Perfluoroelastomers that contain high levels (i.e. about 40 mole percent or more) of perfluoro(alkyl vinyl ether) copolymerized units can form stable blends with higher levels of perfluoropolyethers than can perfluoroelastomers that contain lower levels of perfluoro(alkyl vinyl ether) units. Thus, the former blends have better low temperature properties than the latter.

10 Claims, No Drawings

PERFLUOROELASTOMER COMPOSITIONS FOR LOW TEMPERATURE APPLICATIONS

FIELD OF THE INVENTION

This invention relates to perfluoroelastomer compositions, and in particular to the enhancement of the low temperature properties of such compositions by incorporation of a perfluoropolyether.

BACKGROUND OF THE INVENTION

Elastomeric perfluoropolymers (i.e. perfluoroelastomers) exhibit excellent resistance to the effects of heat, weather, oil, solvents and chemicals. Such materials are commercially available and are most commonly copolymers of tetrafluoroethylene (TFE) with a perfluoro(alkyl vinyl ether) such as perfluoro(methyl vinyl ether) (PMVE). Often, these perfluoroelastomers also contain copolymerized units of a cure site monomer to facilitate vulcanization. While these copolymers have many desirable properties, including low compression set and excellent processability, their low temperature flexibility is not adequate for all end use applications. One particularly desirable improvement would be a reduction in glass transition temperature ($T_g$) with an accompanying extension of service temperature to lower temperatures. $T_g$ is often used as an indicator of low temperature flexibility because polymers having low glass transition temperatures maintain elastomeric properties at low temperatures.

U.S. Pat. No. 4,894,418 discloses vinylidene fluoride based fluoroelastomer compositions which contain processing adjuvants that are perfluorinated polyethers having an hydroxyl group at one or both chain ends. Among the benefits listed for such adjuvants is improved low temperature properties. Being perfluorinated, the polyethers disclosed in the '418 patent are not very compatible with vinylidene fluoride based fluoroelastomers which contain polar hydrogen atoms. Such incompatibility may cause processability problems and lead to the ready extraction of the polyether by solvents.

U.S. Pat. No. 5,268,405 discloses compositions of TFE/PMVE copolymers which also contain a perfluoropolyether (e.g. DuPont's Krytox® fluorinated oil) for reducing the $T_g$ of the composition.

At high temperatures, the perfluoropolyethers employed in all the above compositions tend to be fugitive. As the level of perfluoropolyether in the compositions decreases, the physical properties of the compositions revert to those of compositions containing no perfluoropolyether.

It would be an improvement to have a perfluoroelastomer composition wherein the perfluoropolyether is less fugitive than the above compositions and that also provides the needed reduction in $T_g$.

SUMMARY OF THE INVENTION

It has been surprisingly discovered that compositions of perfluoroelastomers and perfluoropolyethers may be made more stable (i.e. less fugitive) than similar prior art compositions by increasing the amount of copolymerized perfluoro (alkyl vinyl ether) units in the perfluoroelastomer.

Accordingly, an aspect of the present invention is directed to a perfluoroelastomer composition comprising A. a per fluoroelastomer comprising copolymerized units of i) 40 to 55 mole percent perfluoro(alkyl vinyl ether),
ii) 0.1 to 3 mole percent of a cure site monomer and the remaining copolymerized units being of iii) tetrafluoroethylene so that total mole percent is 100; and
B. 25 to 50 phr of a perfluoropolyether.

DETAILED DESCRIPTION OF THE INVENTION

The perfluoroelastomers employed in the compositions of the present invention are capable of undergoing crosslinking reactions with any of the known curatives for perfluoroelastomers such as, but not limited to polyhydroxy compounds such as the combination of organic peroxides and polyfunctional coagents (U.S. Pat. Nos. 4,214,060; 4,983,680), organotin (U.S. Pat. No. 5,789,489), bis(aminophenols) such as diaminobisphenol AF (U.S. Pat. No. 6,211,319 B1), aromatic tetraamines such as 3,3'-diaminobenzidene, and ammonia generating compounds such as urea and other compounds disclosed in U.S. Pat. No. 6,281,296 and WO 01/27194.

Perfluoroelastomers which may be employed in this invention are based on copolymerized units of tetrafluoroethylene (TFE), a perfluoro(alkyl vinyl ether) (PAVE) and a cure site monomer.

Perfluoro(alkyl vinyl ethers) (PAVE) suitable for use as monomers include those of the formula

where $R_{f'}$ and $R_{f''}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl ethers) includes compositions of the formula

where X is F or $CF_3$, n is 0-5, and $R_f$ is a perfluoroalkyl group of 1-6 carbon atoms.

A most preferred class of perfluoro(alkyl vinyl ethers) includes those ethers wherein n is 0 or 1 and $R_f$ contains 1-3 carbon atoms. Examples of such perfluorinated ethers include perfluoro(methyl vinyl ether) (PMVE) and perfluoro (propyl vinyl ether) (PPVE). Other useful monomers include compounds of the formula

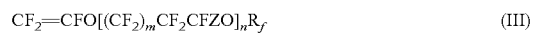

where $R_f$ is a perfluoroalkyl group having 1-6 carbon atoms, m=0 or 1, n=0-5, and Z=F or $CF_3$.

Preferred members of this class are those in which $R_f$ is $CF_3$, m=1, n=1, and Z=F; and $R_f$ is $C_3F_7$, m=0, and n=1.

Additional perfluoro(alkyl vinyl ether) monomers include compounds of the formula

where m and n independently=0-10, p=0-3, and x=1-5.

Preferred members of this class include compounds where n=0-1, m=0-1, and x=1.

Additional examples of useful perfluoro(alkyl vinyl ethers) include

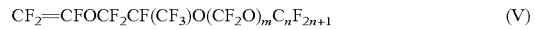

where n=1-5, m=1-3, and where, preferably, n=1.

Perfluoro(methyl vinyl ether) (PMVE) is the most preferred PAVE for use in the perfluoroelastomer that are employed in this invention.

Suitable cure sites for crosslinking by organic peroxide/polyfunctional coagent curing systems include, but are not limited to bromine endgroups, iodine endgroups, or a combination thereof. Such cure sites may be introduced to the perfluoroelastomer polymer chain by polymerization in the presence of a bromine- or iodine-containing chain transfer agent (U.S. Pat. No. 4,243,770). Cure sites may also be introduced by copolymerization of the fluoroelastomer with cure site monomers that contain a bromine or iodine atom such as fluorinated olefins or fluorinated vinyl ethers. Such cure site monomers are well known in the art (e.g. U.S. Pat. Nos. 4,214,060; 5,214,106; and 5,717,036). Specific examples include, but are not limited to bromotrifluoroethylene (BTFE); 4-bromo-3,3,4,4-tetrafluorobutene-1 (BTFB); and 4-iodo-3,3,4,4-tetrafluorobutene-1 (ITFB). Bis-olefins may also be employed as cure site monomers in peroxide curable fluoroelastomers (U.S. Pat. No. 5,585,449)

Suitable cure sites for crosslinking by organic peroxide/polyfunctional coagent, organotin, diaminobisphenol AF, 3,3'-diamonobenzidinene, or ammonia generating curatives include, but are not limited to comonomers that contain a pendant nitrile group such as certain fluorovinyl ethers or fluoroolefins. Specific examples include perfluoro(8-cyano-5-methyl-3,6-dioxa-1-octene) (8-CNVE) and the nitrile-containing cure site monomers disclosed in U.S. Pat. No. 6,211,319 B1.

The perfluoroelastomers that may be employed in the compositions of this invention comprise copolymerized units of i) 40 to 55 (preferably 43 to 50) mole percent perfluoro(alkyl vinyl ether) and ii) 0.1 to 3.0 (preferably 0.3 to 2.0) mole percent cure site monomer. The remaining units being tetrafluoroethylene so that the total mole percent is 100. Most preferably the perfluoro(alkyl vinyl ether) is perfluoro(methyl vinyl ether) and the cure site monomer is perfluorinated vinyl ether or perfluorinated olefin that contains a pendent nitrile group.

Compositions of this invention also contain 25 to 50 (preferably 30 to 40) phr of one or more perfluoropolyethers (PFPE). By "phr" is meant parts by weight per hundred parts of rubber (i.e. perfluoroelastomer). Perfluoropolyethers suitable for use in this invention include, but are not limited to those of the following formula:

$$CF_3-(O-CF_2CF_2)_n(OCF_2)_m-OCF_3 \quad (VI)$$

$$F-(CF_2CF_2CF_2-O)_p-CF_2CF_3 \quad (VII)$$

$$F-(CF(CF_3)-CF_2-O)_q-CF_2CF_3 \quad (VIII)$$

wherein n, m, p and q are integers between 1 and 180. Preferably m+n=40-180 and n/m =0.5-2. Preferably p and q are integers between 10 and 60. Most preferably, the PFPE is of formula VIII having a kinematic viscosity (ASTM D445) of 3500 cSt at 20° C. The latter is available commercially from DuPont as Krytox® 16350 performance lubricant.

The compositions of the present invention include both cured (i.e. crosslinked, vulcanized) compositions and curable compositions. The latter also contain a curing agent.

One curing agent that may be employed is an organic peroxide/polyfunctional coagent system. Useful organic peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to a peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate. When present in the curable compositions of the invention, 1-3 phr peroxide is typically used.

The polyfunctional coagent employed with an organic peroxide is a polyunsaturated compound that is capable of cooperating with the peroxide to provide a useful cure. These coagents can be added in an amount equal to 0.1 and 10 phr, preferably between 2-5 phr. The coagent may be one or more of the following compounds: triallyl cyanurate; triallyl isocyanurate; tri(methallyl)isocyanurate; tris(diallylamine)-s-triazine; triallyl phosphite; N,N-diallyl acrylamide; hexaallyl phosphoramide; N,N,N',N'-tetraalkyl terephthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate (TAIC).

Other curatives which may be employed in the compositions of the invention include bis(aminophenols) such as diaminobisphenol AF, tetraamines, organotin and compounds which decompose to produce ammonia at curing temperatures, e.g. urea. When present in the compositions of this invention, typically 0.1 to 7 phr of any one of the latter curatives is employed.

Other additives may be compounded into the perfluoroelastomer to optimize various physical properties. Such additives include carbon black, stabilizers, lubricants, pigments, fillers (e.g. mineral fillers such as silicas, alumina, aluminum silicate, barium sulfate, titanium dioxide), and processing aids typically utilized in perfluoroelastomer compounding. Any of these additives can be incorporated into the compositions of the present invention, provided the additive has adequate stability for the intended service conditions.

Carbon black often is employed in elastomers as a means to balance modulus, tensile strength, elongation, hardness, abrasion resistance, conductivity, and processability of the compositions. When employed in the compositions of the invention, carbon black is typically added in amounts of from 5-100 (preferably 30-60) phr.

Fluoropolymer fillers may optionally be present in the composition. If present, generally from 1 to 100 (preferably 30-60) phr of a fluoropolymer filler is used, and preferably at least about 5 phr is present. Fluoropolymer fillers include both fluoropolymers that melt at temperatures below the processing and curing temperatures of the compositions of the invention and those fluoropolymers having a melting point above the processing and curing temperatures.

The perfluoropolyether, crosslinking agent, and optional other additives are generally incorporated into the perfluoroelastomer by means of an internal mixer or on a rubber mill. The resultant composition is then cured, generally by means of heat and pressure, for example by compression transfer or injection molding.

Cured articles fashioned from the perfluoroelastomer compositions of the invention exhibit good low temperature properties, with reduced loss of perfluoropolyether from the compositions during exposure to high temperatures than prior compositions. The compositions of the present invention are useful in production of gaskets, tubing, seals and other molded components. Such articles are generally produced by molding a compounded formulation of the curable composition with various additives under pressure, curing the part, and then subjecting it to a post cure cycle. The cured compositions have excellent low temperature flexibility and processability as well as excellent thermal stability and chemical resistance. They are particularly useful in applications such as seals and gaskets requiring a good combination of oil resistance, fuel resistance and low temperature flexibility, for example in fuel injection systems, fuel line connector systems and in other seals for high and low temperature automotive uses.

The invention is now illustrated by certain embodiments wherein all parts and percentages are by weight unless otherwise specified.

EXAMPLES

Test Methods

Cure Characteristics

Unless otherwise noted, cure characteristics were measured using an Alpha Systems model MDR 2000E moving die rheometer (MDR), under the following conditions (ISO 6502):
Moving die frequency: 1.66 Hertz
Oscillation amplitude: ±0.5°
Temperature: 200 C.
Sample size: 6 to 10 g
Duration: 30 minutes
The following cure parameters were recorded:
  $M_H$: maximum torque level, in units of dN·m
  $M_L$: minimum torque level, in units of dN·m
  $t_s2$: minutes to a 2.26 dNm rise above $M_L$
  tc90: minutes to 90% of maximum torque Physical Properties Compression set of AS 568A 214o-rings (ASTM D395)
Glass Transition temperature ($T_g$) was measured by Modulated Differential Scanning Calorimetry (MDSC) at 10°/minute heating rate in nitrogen.

Percent weight loss was measured by weighing the article prior to heating and then weighing again after heating. Prior to weighing, any perfluoropolyether coating the surface of the article was wiped off with paper towel. Results reported are the means of ten O-rings (weight loss during compression set testing) and three O-rings for the other tests.

Low Temperature Static O-Ring Sealing was determined according to R. D. Stevens and E. W. Thomas, "Low Temperature Sealing Capabilities of Fluoroelastomers", SAE Paper #900194, Feb. 26-Mar. 2, 1990. Reported results are the median of three tests.

The perfluoroelastomers (containing copolymerized units of tetrafluoroethylene (TFE), perfluoro(methyl vinyl ether) and 8-CNVE) employed in the Examples were made generally according to the process disclosed in U.S. Pat. No. 5,877,264. All contained about 0.8 mole percent 8-CNVE, the following amount of PMVE and the remainder being TFE.
FE-1 contained 37.4 mole % units of perfluoro(methyl vinyl ether) (PMVE).
FE-2 contained 48.3 mole percent units of perfluoro(methyl vinyl ether) (PMVE).
FE-3 contained 44.7 mole percent units of perfluoro(methyl vinyl ether) (PMVE).

Example 1

A curable composition of the invention (Sample 1) containing a perfluoroelastomer having 48.3 mol % PMVE, and comparative composition (Sample A) containing a perfluoroelastomer having 37.4 mole % PMVE were made by compounding the ingredients in a conventional manner on a 2-roll mill. The ingredients and proportions are shown in Table I.

Cure characteristics of these compositions and physical properties of cured test specimens (200° C. press cure for 20 minutes, followed by post cure in an air oven at 100° C. for 1 hour, followed by 150° C. for 1 hour, 200° C. for 1 hour and at 250° C. for 3 hours) were measured according to the Test Methods. Percent weight loss (i.e. loss of perfluoropolyether) was measured after post cure, after compression set testing and after heat aging under the conditions specified in Table I. Results are shown in Table I. The composition of the invention lost much less weight (i.e. the perfluoropolyether was less fugitive) after exposure to heat than did the comparative composition.

TABLE I

|  | Sample A | Sample 1 |
| --- | --- | --- |
| Formulation, phr |  |  |
| FE-1 | 100 | 0 |
| FE-2 | 0 | 100 |
| MT Carbon Black[1] | 40 | 40 |
| Perfluoropolyether[2] | 35 | 35 |
| Diaminobisphenol AF | 1.75 | 1.75 |
| Curing Characteristics |  |  |
| $M_L$, dN · m | 2.4 | 0.8 |
| $M_H$, dN · m | 7.3 | 6.1 |
| $t_s2$, minutes | 7.6 | 8.4 |
| tc90, minutes | 17.7 | 13.0 |
| Physical Properties |  |  |
| Compression Set, O-rings, 25%, 204° C., 70 hours, % | 40 | 31 |
| $T_g$, ° C. | −23.4 | −23.6 |
| Weight Loss |  |  |
| After Post Cure, O-rings, % | 1.13 | 0.23 |
| After Compression Set Measurement, O-rings, % | 3.08 | 0.56 |
| After Heat Aging, dumbbells, 200° C., 70 hours,% | 1.02 | <0.05 |

[1]MT Thermax N 990 (available from Lehmann & Voss Co.)
[2]Krytox ® 16350 (available from DuPont)

Example 2

A curable composition of the invention (Sample 2) containing a perfluoroelastomer having 44.7 mol % PMVE, and comparative composition (Sample B) containing a perfluoroelastomer having 37.4 mole % PMVE were made by compounding the ingredients in a conventional manner on a 2-roll mill. The ingredients and proportions are shown in Table II.

Cure characteristics of these compositions and physical properties of cured test specimens (200° C. press cure for 9-10 minutes, followed by post cure in an air oven at 100° C. for 1 hour, followed by 150° C. for 1 hour, 200° C. for 1 hour and at 250° C. for 3 hours) were measured according to the Test Methods. Results are shown in Table II. The composition of the invention lost much less weight after exposure to heat (i.e. the perfluoropolyether was less fugitive) than did the comparative composition. Additionally, the composition of the invention had a better (i.e. lower) Low Temperature Static Sealing Temperature than did the comparative composition.

TABLE II

|  | Sample B | Sample 2 |
|---|---|---|
| Formulation, phr |  |  |
| FE-1 | 100 | 0 |
| FE-3 | 0 | 100 |
| MT Carbon Black[1] | 50 | 50 |
| Perfluoropolyether[2] | 35 | 35 |
| Urea | 0.3 | 0.3 |
| Curing Characteristics |  |  |
| $M_L$, dN·m | 2.7 | 0.9 |
| $M_H$, dN·m | 8.8 | 8.1 |
| $t_s2$, minutes | 1.7 | 1.5 |
| tc90, minutes | 4.9 | 3.7 |
| Physical Properties |  |  |
| Compression Set, O-rings, 25%, 200° C., 70 hours, % | 41 | 41 |
| Low Temperature Static O-Ring Sealing, ° C. | −36.2 | −39.3 |
| Weight Loss |  |  |
| After Post Cure, O-rings, % | 0.88 | 0.17 |
| After Compression Set Measurement, O-rings, % | 3.66 | 1.49 |
| After Heat Aging, dumbbells, 200° C., 70 hours, % | 0.84 | 0.05 |

[1] MT Thermax N 990 (available from Lehmann & Voss Co.)
[2] Krytox ® 16350 (available from DuPont)

What is claimed is:

1. A perfluoroelastomer composition comprising
   A) a perfluoroelastomer comprising copolymerized units of i) 40 to 55 mole percent perfluoro(alkyl vinyl ether), ii) 0.1 to 3 mole percent of a cure site monomer and the remaining copolymerized units being of iii) tetrafluoroethylene so that total mole percent is 100; and
   B) 25 to 50 phr of a perfluoropolyether selected from the group consisting of i) $CF_3$—(O—$CF_2CF_2$)$_n$($OCF_2$)$_m$—$OCF_3$; ii) F—($CF_2CF_2CF_2$—O)$_p$—$CF_3$; and iii) F—(CF($CF_3$)—$CF_2$—O)$_q$—$CF_2CF_3$ wherein n, m, p and q are integers between 1 and 180.

2. A perfluoroelastomer composition of claim 1 wherein said perfluoroelastomer contains 43 to 50 mole percent copolymerized units of perfluoro(methyl vinyl ether).

3. A perfluoroelastomer composition of claim 1 wherein said cure site monomer is selected from the group consisting of fluorovinyl ethers having a pendant nitrite group and fluoroolefins having a pendant nitrile group.

4. A perfluoroelastomer composition of claim 1 further comprising C) a curative.

5. A perfluoroelastomer composition of claim 4 wherein said curative is selected from the group consisting of organic peroxides, bis(aminophenols), organotin compounds and compounds that decompose at curing temperatures to release ammonia.

6. A cured article formed from a composition comprising the composition of claim 4.

7. A perfluoroelastomer composition of claim 1 wherein said perfluoropolyether is $CF_3$—(O—$CF_2CF_2$)$_n$($OCF_2$)$_m$—$OCF_3$ wherein m+n=40-180 and n/m=0.5-2.

8. A perfluoroelastomer composition of claim 1 wherein said perfluoropolyether is F—($CF_2CF_2CF_2$—O)$_p$—$CF_3$ wherein p is an integer between 10 and 60.

9. A perfluoroelastomer composition of claim 1 wherein said perfluoropolyether is F—(CF($CF_3$)—$CF_2$—O)$_q$—$CF_2CF_3$ wherein q is an integer between 10 and 60.

10. A perfluoroelastomer composition of claim 9 wherein said perfluoropolyether is F—(CF($CF_3$)—$CF_2$—O)$_q$—$CF_2CF_3$ having a kinematic viscosity, as measured by ASTM D445, of 3500 cSt at 20° C.

* * * * *